(12) United States Patent
Bao et al.

(10) Patent No.: US 9,837,050 B2
(45) Date of Patent: Dec. 5, 2017

(54) INFORMATION PROCESSING METHOD, METHOD FOR DRIVING IMAGE COLLECTION UNIT AND ELECTRICAL DEVICE

(71) Applicants: LENOVO (BEIJING) CO., LTD., Beijing (CN); BEIJING LENOVO SOFTWARE LTD., Haidian District, Beijing (CN)

(72) Inventors: Haidong Bao, Beijing (CN); Ningyu Wang, Beijing (CN); Xianshuan Zeng, Beijing (CN); Ying Gao, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 991 days.

(21) Appl. No.: 13/793,836

(22) Filed: Mar. 11, 2013

(65) Prior Publication Data
US 2013/0235083 A1 Sep. 12, 2013

(30) Foreign Application Priority Data

Mar. 12, 2012 (CN) .......................... 2012 1 0064140
Mar. 26, 2012 (CN) .......................... 2012 1 0082677

(51) Int. Cl.
*G09G 5/00* (2006.01)
*G09G 5/34* (2006.01)
(Continued)

(52) U.S. Cl.
CPC ............. *G09G 5/34* (2013.01); *G06F 1/1618* (2013.01); *G06F 3/1423* (2013.01);
(Continued)

(58) Field of Classification Search
CPC ....... G05G 5/34; G06F 9/4421; G06F 3/1423; G06F 1/1618; G09G 2300/02; G09G 2330/022
(Continued)

(56) References Cited

U.S. PATENT DOCUMENTS 7,401,300 B2   7/2008 Nurmi
8,670,002 B2   3/2014 Kim
(Continued)

FOREIGN PATENT DOCUMENTS

CN   1564651   1/2005
CN   1906565   1/2007
(Continued)

OTHER PUBLICATIONS

First Office Action dated Aug. 6, 2013 from corresponding Chinese Application No. 2012100826775 (15 pages including English translation).
(Continued)

*Primary Examiner* — Jennifer Nguyen
(74) *Attorney, Agent, or Firm* — Brinks Gilson & Lione; G. Peter Nichols

(57) ABSTRACT

An information processing method and an electrical device are described. The information processing method is applied to an electrical device having at least a processing unit, the electrical device has a plurality of usage modes and further includes a plurality of sensing units. The method includes acquiring, by the processing unit, data collected by the plurality of the sensing units; judging whether the electrical device is in a first usage mode according to the acquired data collected by the plurality of the sensing units; wherein the first usage mode is one of the plurality of the usage modes. With the present method, objects of integrating a plurality of usage modes into one electrical device and judging a usage
(Continued)

mode corresponding to a current application scene efficiently are realized.

13 Claims, 10 Drawing Sheets

(51) Int. Cl.
*G06F 9/44* (2006.01)
*G06F 3/14* (2006.01)
*G06F 1/16* (2006.01)

(52) U.S. Cl.
CPC .... *G06F 9/4421* (2013.01); *G06F 2200/1637* (2013.01); *G09G 2300/02* (2013.01); *G09G 2330/022* (2013.01); *G09G 2356/00* (2013.01)

(58) Field of Classification Search
USPC .......................................... 345/1.1, 1.3, 901
See application file for complete search history.

(56) References Cited

U.S. PATENT DOCUMENTS

| | | | |
|---|---|---|---|
| 8,866,840 B2 | 10/2014 | Dahl et al. | |
| 2006/0284855 A1* | 12/2006 | Shintome | G06F 1/1616 345/173 |
| 2007/0058329 A1* | 3/2007 | Ledbetter | F16M 11/10 361/679.06 |
| 2009/0244012 A1 | 10/2009 | Behar et al. | |
| 2010/0245209 A1 | 9/2010 | Miller et al. | |
| 2010/0298032 A1 | 11/2010 | Lee | |
| 2011/0179864 A1* | 7/2011 | Raasch | G06F 1/1616 73/493 |
| 2011/0216064 A1 | 9/2011 | Dahl et al. | |
| 2011/0249042 A1* | 10/2011 | Yamamoto | G09G 3/342 345/690 |
| 2011/0267478 A1* | 11/2011 | Jacobs | G06F 1/1616 348/207.11 |
| 2011/0320405 A1 | 12/2011 | Hsu | |
| 2013/0021266 A1* | 1/2013 | Selim | G06F 3/0487 345/173 |
| 2013/0076655 A1* | 3/2013 | Sirpal | G06F 3/1438 345/173 |

FOREIGN PATENT DOCUMENTS

| | | |
|---|---|---|
| CN | 101237556 | 8/2008 |
| CN | 101291352 | 10/2008 |
| CN | 201491128 U | 5/2010 |
| CN | 101800810 | 8/2010 |
| CN | 102033689 | 4/2011 |
| CN | 202815659 U | 3/2013 |
| GB | 2 434 274 | 7/2007 |
| WO | WO 2010/028399 | 3/2010 |

OTHER PUBLICATIONS

Examination Report dated Sep. 17, 2014 from corresponding German Application No. DE 10 2013 004 373.5 (7 pages including English translation).
Examination Report dated Feb. 14, 2014 from corresponding Korean Application No. 10-2013-0025594 (7 pages including English translation).
Second Office Action dated Mar. 5, 2014 from corresponding Chinese Application No. 201210082677.5 (17 pages including English translation).
Third Office Action dated Jul. 24, 2014 from corresponding Chinese Application No. 201210082677.5 (13 pages including English translation).
Chinese Application No. 201210064140.6 First Office Action dated Jul. 9, 2015 (19 pages including English translation).
German Patent Application No. 10 2013 004 373.5 Office Action dated Sep. 4, 2015 (15 pages including English translation).
Second Office Action dated Dec. 8, 2015 (37 pages) out of Chinese priority Application No. 201210064140.6.
Office Action dated Jul. 2, 2017 (15 pages including English translation) out of German priority Application No. 102013004373.5.

* cited by examiner acquiring, by the processing unit in the electrical device, data collected by the plurality of the sensing units ~S701 judging, by the processing unit, the included angle between the first body and the level plane and/or the included angle between the second body and the level plane according to the acquired data collected by the plurality of sensing units ~S702

Fig. 11 acquiring, by the processing unit in the electrical device, data collected by the first gravity sensor and the second gravity sensor ~S801 judging, by the processing unit, the included angle between the first body and the level plane and/or the included angle between the second body and the level plane according to the acquired data collected by the first gravity sensor and the second gravity sensor ~S802

Fig. 12

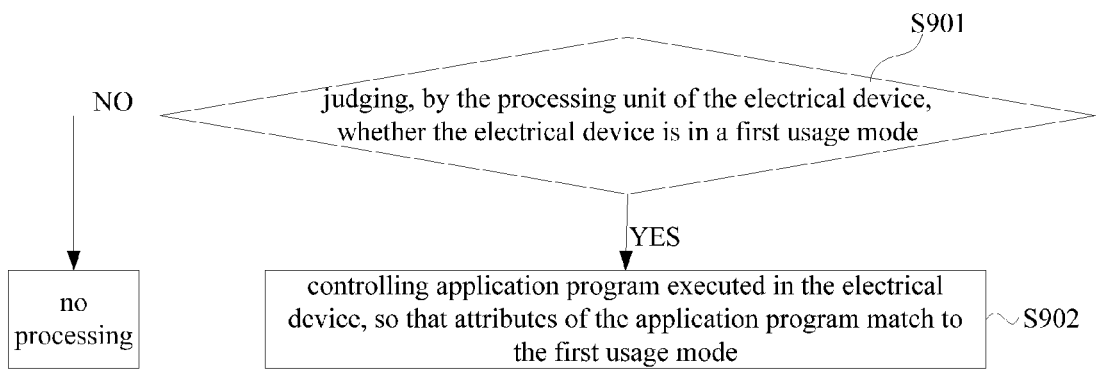

ND ELECTRICAL
INFORMATION PROCESSING METHOD, METHOD FOR DRIVING IMAGE COLLECTION UNIT AND ELECTRICAL DEVICE

This application claims priority to Chinese patent application No. CN201210064140.6 filed on Mar. 12, 2012; and to Chinese patent application No. CN201210082677.5 filed on Mar. 26, 2012, the entire contents of each are incorporated herein by reference.

The present invention relates to a technical field of electrical device, and in particularly, to an information processing method, a method for driving image collection unit and an electrical device.

BACKGROUND

With development of science and technology, various electrical devices enrich people's lives continuously and bring many conveniences. The electrical device has become an indispensible part in the people's lives or works, because it may be convenient and save resources in processing information.

In terms of portability and usability, etc, a panel computer has notable advantages as compared with a conventional notebook computer, while the notebook computer is superior in its strong hardware performance, terminal system, software application and the like. Therefore many consumers may purchase the notebook computer and the panel computer at the same time so as to apply them to different application scenes, since each of them has its own specialized skills.

Thus, how to integrate a plurality of usage modes into one electrical device and judge a usage mode corresponding to a current application scene efficiently is a focus being worth paying attention to.

Furthermore, with a development of the electronic technique, various electrical devices, such as a panel computer, a notebook computer, a mobile phone, an electrical dictionary, a video playing terminal, etc, have been applied to daily works and lives gradually. Each of these electrical devices has its own specialized skills and is suitable for different usage scenes and functions. For example, the advantages of the panel computer are that it is convenient to be carried, has functions such as handwriting recognition, voice recognition and has a strong entertainment, but it also has disadvantages of being difficult to realize a high speed character input, requiring assistance or support by hand as used, etc. the notebook computer has advantages of being convenient when used in works, suitable for the high speed character input and the like, but the portability and entertainment function thereof are inferior to the panel computer. Due to limitations on space, convenience, etc, it is difficult to carry several electrical devices.

Currently, it has adopted some measures to overcome the shortcomings in the electrical device. For example, for the supporting problem of the panel computer, it has developed a supporting bracket for the panel computer. However, this supporting bracket is two-point type and is difficult to support stably, and fails to overcome other shortcomings in the panel computer. Furthermore, a touch screen is applied to the notebook computer so as to enhance its entertainment function and convenience. However, a body, including the touch screen, of the notebook computer would shake easily when the notebook computer is operated by the touch screen, which may lead to inconvenience in operation.

Therefore it is desired an electrical device which may be applied to various scenes expediently and have a plurality of usage modes.

Additionally, when the usage mode of the electrical device changes, maybe structure or operation state of the electrical device needs to be adjusted, and implementation and state of each function in the electrical device needs to be adjusted, so that the electrical device may achieve an optimal function implementation effect. For example, in a video communication, different disposition of image collection units may be required for different usage scene of the electrical device so as to collect desired video image. Accordingly, it is further desired a solution which may implement the functions of the electrical device according to the different usage modes or usage scenes of the electrical device.

SUMMARY

In order to solve the technical problem above, embodiments of the present disclosure provide an information processing method and an electrical device which integrate a plurality of usage modes into one electrical device and judge a usage mode corresponding to a current application scene effectively.

An information processing method applied to an electrical device having at least a processing unit, the electrical device has a plurality of usage modes and further comprises a plurality of sensing units, comprising:

acquiring, by the processing unit, data collected by the plurality of the sensing units;

judging whether the electrical device is in a first usage mode according to the acquired data collected by the plurality of the sensing units;

wherein the first usage mode is one of the plurality of the usage modes.

The embodiments of the present disclosure also provide an information processing method applied to an electrical device having at least a processing unit, the electrical device has a first body, a second body and a connection part connecting the first body with the second body, and the electrical device further comprises a plurality of sensing units, comprising:

acquiring, by the processing unit, data collected by the plurality of the sensing units;

judging an included angle between the first body with a horizontal plane and/or an included angle between the second body with the horizontal plane according to the acquired data collected by the plurality of the sensing units.

The embodiments of the present disclosure further provide an information processing method applied to an electrical device having at least a processing unit, the electrical device has a plurality of usage modes, comprising:

judging, by the processing unit, whether the electrical device is in a first usage mode, wherein the first usage mode is one of the plurality of usage modes;

controlling applications executed in the electrical device so that attitudes of the applications matches with the first usage mode, when the processing unit determines that the electrical device is in the first usage mode.

The embodiments of the present disclosure still provide an information processing method applied to an electrical device having at least a processing unit, the electrical device has a plurality of usage modes and further comprises an external unit, comprising:

judging, by the processing unit, whether the electrical device is in a first usage mode, wherein the first usage mode is one of the plurality of usage modes;

controlling an operation state of the external unit to be matched with the first usage mode, when the processing unit determines that the electrical device is in the first usage mode.

The embodiments of the present disclosure further provide an information processing method applied to an electrical device having at least a processing unit, the electrical device has a plurality of usage modes, comprising:

judging, by the processing unit, whether the electrical device is in a first usage mode, wherein the first usage mode is one of the plurality of usage modes;

controlling an operating system of the external unit to be matched with the first usage mode, when the processing unit determines that the electrical device is in the first usage mode.

The embodiments of the present disclosure further provide an electrical device, the electrical device has a first body, a second body and a spin axis connecting the first body with the second body, the second body can rotate a degree of 360 with respect to the first body by means of the spin axis;

the electrical device has a plurality of usage modes and comprises a processor and at least two gravity sensors, wherein the at least two gravity sensors comprise a first gravity sensor disposed at the first body and a second gravity sensor disposed at the second body;

the first gravity sensor is configured to collect a first included angle between a sensitive axis in the first gravity sensor with a gravity direction, when the second body rotates with respect to the first body;

the second gravity sensor is configured to collect a second included angle between a sensitive axis in the second gravity sensor with the gravity direction, when the second body rotates with respect to the first body;

the processor is configured to judge whether the electrical device is in a first usage mode according to the acquired first included angle and second included angle, wherein the first usage mode is one of the plurality of usage modes.

The embodiments of the present disclosure further provide an electrical device, the electrical device has a first body, a second body and a spin axis connecting the first body with the second body, the second body can rotate a degree of 360 with respect to the first body by means of the spin axis;

the electrical device has a plurality of usage modes and comprises at least a processor, at least one first gravity sensor disposed at the first body and at least one distance sensor disposed at the second body;

the first gravity sensor is configured to collect a first included angle between a sensitive axis in the first gravity sensor with a gravity direction, when the second body rotates with respect to the first body;

the distance sensor is configured to collect a close distance to an object, when the second body rotates with respect to the first body;

the processor is configured to judge whether the electrical device is in a first usage mode according to the acquired first included angle and close distance to an object, wherein the first usage mode is one of the plurality of usage modes.

In solutions provided by the embodiments of the present disclosure, an electrical device has a plurality of usage modes and comprises at least a processing unit and a plurality of sensing units; during an operation process of the electrical device, the processing unit acquires data collected by the plurality of the sensing units and judges whether the electrical device is in one usage mode of the plurality of usage modes according to the collected data. As compared with the prior art, the electrical device according to the present disclosure may set a plurality of usage modes and judge the usage mode corresponding to the current application scene according to the data collected by the sensing units.

Further, another embodiment of the present disclosure still provides an electrical device which has a plurality of usage modes and is convenient for being used in different scenes, thus user experiences are promoted. The embodiments of the present disclosure further provide a method for driving an image collection unit in the electrical device which may drive the image collection unit differently for the different usage modes of the electrical device and perform an image collection function optically in the different usage modes.

On the one hand, an electrical device is provided, comprising: an image collection unit; a first body on which a display unit is disposed; a second body; and a spin axis for connecting the first body with the second body, wherein the first body can rotate a degree of 360 with respect to the second body by means of the spin axis.

By making the first body to rotate the degree of 360 with respect to the second body by means of the spin axis, the electrical device may have different usage modes applicable to different scenes.

Preferably, the image collection unit may be a plurality of image collection units including at least a first image collection unit and a second image collection unit, the first image collection unit and the second image collection unit are disposed on two edges opposite each other of the display unit.

As compared with a scheme in which the image collection is performed with one image collection unit, two image collection units are used and disposed on opposite positions, thus a good image collection effect may be realized in different usage modes of the electrical device.

Preferably, the electrical device may further comprise: a judgment unit for judging the usage mode in which the electrical device is and generating a judgment result; and a processing unit for driving the at least one of the plurality of the image collection units in the operation state according to the judgment result.

The image collection units are driven or controlled properly for the different usage modes of the electrical device with the judgment unit and the processing unit.

Preferably, the image collection unit may be a single image collection unit, and the single image collection unit is disposed on one of two sides of the display unit.

In a case of utilizing the single image collection unit to perform the image collection, the electrical device may achieve an optimal image collection effect in different usage modes by disposing the image collection unit at a suitable position.

Preferably, the single image collection unit may be rotated, and the electrical device may further comprises: a judgment unit for judging the usage mode in which the electrical device is and generating a judgment result; and a processing unit for rotating the single image collection unit according to the judgment result, so that the orientation of the single image collection unit matches to the usage mode in which the electrical device is.

In a case of utilizing the single image collection unit to perform the image collection, the effect of the image collection is enhanced by rotating an image collection orientation of the single image collection unit for different usage modes of the electrical device.

Preferably, the first body may have a first surface on which the display unit is located and a second surface being opposite to the first surface, and the second body may have a third surfacing comprising an input apparatus and a fourth surface being opposite to the third surface. The first body rotates a degree of 360 with respect to the second body so as to change the usage mode of the electrical device, and the usage modes may comprises at least two of a notebook mode wherein an included angle between the first surface and the third surface is within a range of 0°-180°, an panel mode wherein the included angle is 360°, a tent mode wherein the included angle is within a range of 180°-360° and a common side between the first surface and the third surface goes up, and a standing mode wherein the included angle is within the range of 180°-360° and the third surface faces downwards.

The electrical device has four usage modes comprising the notebook mode, the panel mode, the tent mode and the standing mode, so that the user's usage requirements in different environments may be satisfied by one electrical device and a trouble caused by carrying several devices is avoided.

Preferably, the first image collection unit is disposed on a top side, which is far away from the common side, of the display unit, and the second image collection unit is disposed on a bottom side, which is near to the common side, of the display unit, and the processing unit performs driving operations as follows: when the judgment result indicates that the electrical device is in the notebook mode or the standing mode, the first image collection unit is in an operation state while the second image collection unit is in a close state; when the judgment result indicates that the electrical device is in the tent mode, the first image collection unit is in the close state while the second image collection unit is in the operation state; and when the judgment result indicates that the electrical device is in the panel mode or the standing mode, at least one of the first image collection unit and the second image collection unit is in the operation state.

Preferably, the display unit may comprise a touch screen so as to operate the electrical device in the different usage modes.

Preferably, at least one of the plurality of the image collection units may be rotated.

Preferably, the single image collection unit may be composed of at least two pickup elements having different image collection scope, in order to enhance the image collection effect of the single image collection unit.

On the other hand, there is provided a method for driving image collection unit, applied to an electrical device comprising the image collection unit, a first body on which a display unit is disposed, a second body and a spin axis connecting the first body with the second body, the first body can rotate a degree of 360 with respect to the second body by means of the spin axis, the image collection unit comprises one or more image collection units, and the electrical device has a plurality of usage modes, the method comprises: judging which usage mode the electrical device is in among the plurality of usage modes and acquiring a judgment result; and according to a specified usage mode in which the electrical device is, indicated by the judgment result, driving the one or more image collection units in a driving manner matching to the specified usage mode.

In the solutions according to the embodiments of the present disclosure, by making the first body rotate a degree of 360 with respect to the second body, the electrical device has a plurality of usage modes and is convenient for being used in different scenes, thus user experiences are promoted. Furthermore, in the electrical device having the plurality of usage modes, the image collection units are driven differently for the different usages, thus an image collection function is performed optically in the different usage modes.

BRIEF DESCRIPTION OF THE DRAWINGS

The present invention will become more fully understood from the detailed description given hereinafter and the accompanying drawings used when describing the embodiments or prior art, which are given by way of illustration only, and thus are not limitative of the present invention. Those skilled in the art can obtain other drawings according to the drawings shown herein without inventive labors.

FIG. 11 is a seventh flow chart of an information processing method provided in the embodiments of the present disclosure.

FIG. 12 is an eighth flow chart of an information processing method provided in the embodiments of the present disclosure.

FIG. 13 is a ninth flow chart of an information processing method provided in the embodiments of the present disclosure.

DETAILED DESCRIPTION

Thereafter will describe the solutions according to the embodiments of the present invention clearly and fully in connection with the drawings in the embodiments of the present invention. Obviously, the embodiments described are only a part of embodiments of the present invention instead of all of the embodiments. All of other embodiments educing from the embodiments of the present disclosure by those ordinary skilled in the art without any inventive labors are fallen into the scope of the present invention.

In order to integrate a plurality of usage modes into one electrical device and judge a usage mode corresponding to a current application scene efficiently, embodiments of the present disclosure provide an information processing method and an electrical device.

Thereafter will describe the information processing method provided by the embodiments of the present disclosure firstly.

It should note that the information processing method provided by the embodiments of the present disclosure is applicable to an electrical device at least having a processing unit and configured to have a plurality of usage modes and a plurality of sensing units. Wherein the plurality of usage modes may be a notebook usage mode, a panel computer usage mode, etc; and the sensing unit may be a gravity sensor, a distance sensor, etc. it should understand that the electrical device may be a mobile phone, notebook computer and the like.

Figure 1:
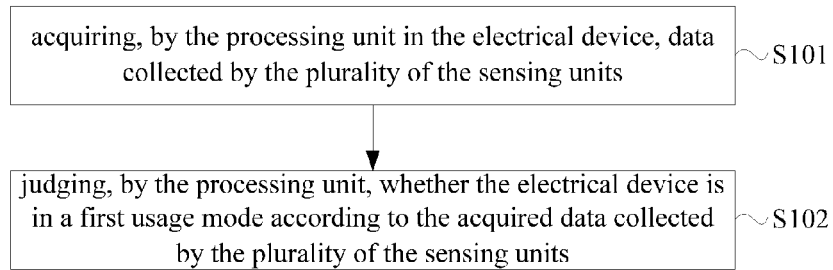
FIG. 1 is a first flow chart of an information processing method provided in the embodiments of the present disclosure.

As illustrated in FIG. 1, an information processing method may comprises steps as follows.

In S101, acquiring, by the processing unit in the electrical device, data collected by the plurality of the sensing units.

In an operation process of the electrical device, the plurality of sensing units disposed in the electrical device collect corresponding data for the electrical device real-time, and a processing unit in the electrical device acquires the data collected by the plurality of sensing units real-time and performs subsequent processing according to the collected data.

It may understand that different types of sensing units collect different data. For example, when the sensing unit is the gravity sensor, the collected data may be an included angle between a sensitive axis in the gravity sensor and a gravity direction according to an operation principle of the gravity sensor; and when the sensing unit is the distance sensor, the collected data may be a distance close to the distance sensor by an object according to the operation principle of the distance sensor.

In S102, judging, by the processing unit, whether the electrical device is in a first usage mode according to the acquired data collected by the plurality of the sensing units.

Wherein the first usage mode is one of the plurality of the usage modes.

After acquiring the data collected by the plurality of sensing units, the processing unit judges a usage mode required in the current application scene according to the acquired data collected by the plurality of sensing units. For example, the processing unit may judge the usage mode of the electrical device which corresponds to the current application scene is the notebook usage mode or the panel computer usage mode according to the collected data.

It should understand that types of the collected data are different in the different sensing units and the detailed judging methods are also different in judging the usage mode in which the electrical device is using the collected data by the processing unit.

In the present embodiment, the electrical device has the plurality of usage modes and comprises at least the processing unit and the plurality of sensing units; during an operation process of the electrical device, the processing unit acquires data collected by the plurality of the sensing units and judges whether the electrical device is in one usage mode of the plurality of usage modes according to the collected data. As compared with the prior art, the electrical device according to the present disclosure may set a plurality of usage modes and judge the usage mode corresponding to the current application scene according to the data collected by the sensing units.

Below will describe an information processing method provided in the present invention in connection with detailed embodiments.

It should note that an electrical device to which the information processing method provided in the embodiments of the present disclosure is applicable has a first body, a second body and a spin axis connecting the first body with the second body, the second body can rotate a degree of 360 with respect to the first body by means of the spin axis; and the electrical device has a processing unit, four usage modes, a first gravity sensors and a second gravity sensor.

Figure 2:
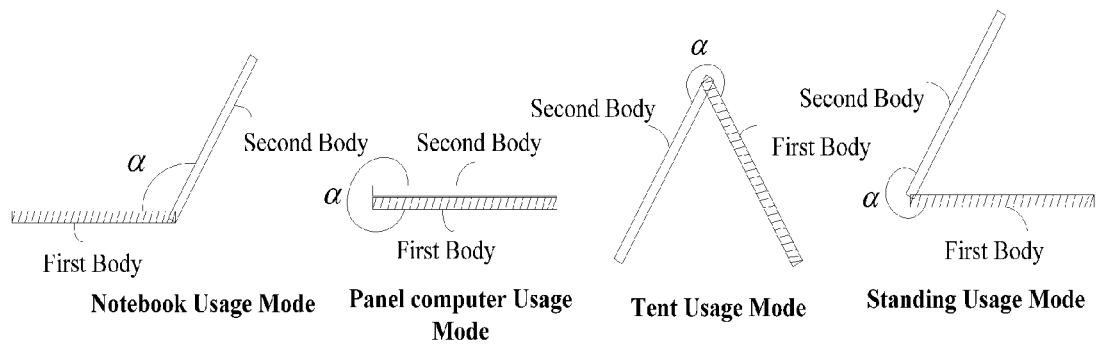
FIG. 2 is an exemplary view of four usage modes in an electrical device provided in the embodiments of the present disclosure.

As illustrated in FIG. 2, the four usage modes in the electrical device may comprise a notebook computer usage mode, a panel computer usage mode, a tent usage mode and a standing usage mode. Wherein in the notebook usage mode suitable for daily work, an opening angle α between the first body and the second body is within 0°-180°; in the panel computer usage mode suitable for a touch application, the opening angle α between the first body and the second body is 360°; in the tent usage mode suitable for viewing a video, photos, etc, the opening angle α between the first body and the second body is about 300°; and in the standing usage mode suitable for project explanation, project presentation and the like, the opening angle α between the first body and the second body is about 300°. It can be seen that the opening angle α between the first body and the second body is about 300° both for the tent usage mode and the standing usage mode, however a direction of a screen on the second body is rotated of 180° in the tend usage mode, while the direction of the screen on the second body is not rotated in the standing usage mode.

It should understand that the usage modes in the electrical device are not limited to the notebook usage mode, the panel computer usage mode, the tent usage mode and the standing usage mode, and other usage modes may be added according to requirements of users. Also, the sensing units are not limited to the first gravity sensor and the second gravity sensor, and other gravity sensors may be added in actual practice.

Figure 3:
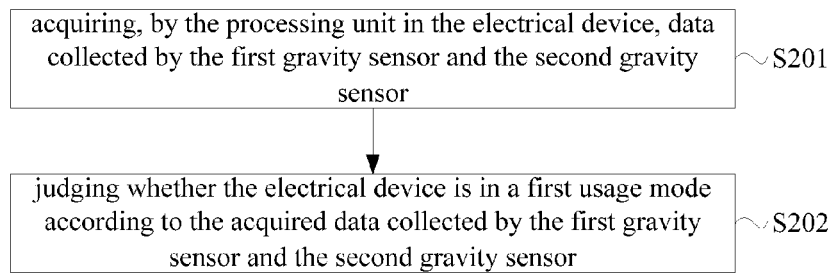
FIG. 3 is a second flow chart of an information processing method provided in the embodiments of the present disclosure.

As illustrated in FIG. 3, an information processing method comprises steps as follows.

In S201, acquiring, by the processing unit in the electrical device, data collected by the first gravity sensor and the second gravity sensor.

In the present embodiment, the collected data comprises at least a first included angle between a sensitive axis in the first gravity sensor with a gravity direction and a second included angle between a sensitive axis in the second gravity sensor with the gravity direction. Below will explain the gravity sensor briefly to assist understanding.

Figure 4:
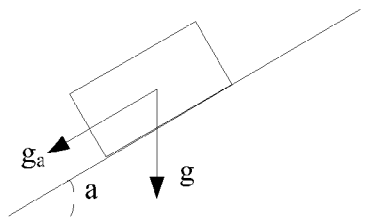
FIG. 4 is an exemplary view illustrating a process of measuring an angle by a gravity sensor.

The gravity sensor is a sensor for converting a movement and gravity into an electrical signal, and is mainly used for measuring parameters such as a slope angle, an inertial force, an impact, a vibration, etc. In measurement of the slope angle of a platform, the gravity sensor is disposed on the platform to be measured, wherein the sensitive axis of the gravity sensor is identical with an axis direction of the slope platform and a level state of the gravity sensor should parallel a horizontal plane. As illustrated in FIG. 4, a is a slop angle of the platform along a certain direction; a quality mass of the gravity sensor generates an offset due to an effect of a component $g_a$ of a gravity acceleration g in a tile direction, which makes a change in an output voltage of the gravity sensor. Given that the output of the gravity sensor in the level state is $V_0$, the output thereof when the slope angle is a, and the output thereof under an effect of acceleration Ig is V, then:

$$V_a = V/g \times \sin a \times Ig + V_0$$

That is, $$a = \arcsin[(V_a - V_0)/V].$$

With the above equation, the slope angle of the platform in a certain direction may be obtained conveniently.

It may understand that the first gravity sensor and the second gravity sensor are required to be disposed on different bodies because the included angle between the first body and the second body is needed to be measured. For example, the first gravity sensor may be disposed on the first body while the second gravity sensor may be disposed on the second body; or the first gravity sensor may be disposed on the second body while the second gravity sensor may be disposed on the first body.

For example, the first gravity sensor may be disposed on the first body while the second gravity sensor may be disposed on the second body. Wherein the first body is a host while the second body is a display; the direction of the sensitive axis in the first gravity sensor is a direction which is parallel to a thickness direction of the first body, and a positive direction is vertical to a usage surface of the first body inwardly; and the direction of the sensitive axis in the second gravity sensor is a direction which is parallel to a thickness direction of the second body, and a positive direction is vertical to a usage surface of the second body outwardly. Wherein a corresponding relationship between a combination of the collected first included angles and second included angles with the usage modes is shown in Table 1.

TABLE I

| Usage Mode | First Included Angle (°) | Second Included Angle (°) |
|---|---|---|
| Notebook | 0 | 0~180 |
| Panel Computer | 180 | 180 |
| Tent | 0~90 | 90~180 |
| Standing | 180 | 90~180 |

As known from the Table 1, the combinations of the first included angle and the second included angle corresponding different usage modes are different, therefore the usage mode corresponding to a current application scene may be determined according to a preset corresponding relationship after determining the first included angle and the second included angle.

Also, the first gravity sensor may be disposed on the first body while the second gravity sensor may be disposed on the second body. Wherein the first body is a host while the second body is a display; the direction of the sensitive axis in the first gravity sensor is a direction which is parallel to a thickness direction of the first body, and a positive direction is vertical to a usage surface of the first body outwardly; and the direction of the sensitive axis in the second gravity sensor is a direction which is parallel to a thickness direction of the second body, and a positive direction is vertical to a usage surface of the second body inwardly. Wherein a corresponding relationship between a combination of the collected first included angles and second included angles with the usage modes is shown in Table 2.

TABLE 2

| Usage Mode | First Included Angle (°) | Second Included Angle (°) |
|---|---|---|
| Notebook | 180 | 0~180 |
| Panel Computer | 0 | 0 |
| Tent | 0~90 | 90~180 |
| Standing | 0 | 0~90 |

As known from the Table 2, the combinations of the first included angle and the second included angle corresponding different usage modes are different, therefore the usage mode corresponding to a current application scene may be determined according to a preset corresponding relationship after determining the first included angle and the second included angle.

It can be seen that the corresponding relationship between the combination of included angles and the usage modes is set according to the bodies on which the first gravity sensor and the second gravity sensor are disposed and the direction of the sensitive axis and has an unique correspondence.

In S202, judging, whether the electrical device is in a first usage mode according to the acquired data collected by the first gravity sensor and the second gravity sensor.

Wherein the first usage mode is one of the plurality of the usage modes.

The usage mode corresponding to the current application scene of the electrical device may be judged according to the first included angle between the sensitive axis of the first gravity sensor and the gravity direction and the second included angle between the sensitive axis of the second gravity sensor and the gravity direction, after acquiring the first included angle and the second included angle.

As shown in the Table 1 and Table 2, the combinations of the first included angle and the second included angle corresponding different usage modes are different, therefore the usage mode corresponding to the current application scene may be judged according to the corresponding relationship between the combinations of the first included angle and the second included angle with the usage modes after acquiring the first included angle and the second included angle.

In the present embodiment, the electrical device has four usage modes and comprises at least the processing unit, the first gravity sensor and the second gravity sensor; during an operation process of the electrical device, the processing unit acquires data collected by the first gravity sensor and the second gravity sensor, and judges whether the electrical device is in one usage mode of the four usage modes according to the collected data. As compared with the prior art, the electrical device according to the present disclosure may set four usage modes and judge the usage mode corresponding to the current application scene according to the data collected by the first gravity sensor and the second gravity sensor.

Below will describe an information processing method provided in the present invention in connection with another detailed embodiment.

Also, it should note that an electrical device to which the information processing method provided in the embodiments of the present disclosure is applicable has a first body, a second body and a spin axis connecting the first body with the second body, the second body can rotate a degree of 360 with respect to the first body by means of the spin axis; and the electrical device has a processing unit, four usage modes, a first gravity sensors and a distance sensor.

As illustrated in FIG. 2, the four usage modes in the electrical device may comprise a notebook computer usage mode, a panel computer usage mode, a tent usage mode and a standing usage mode. The detailed explanations for the four usage modes may refer to the above-described embodiment.

It should understand that the usage modes in the electrical device are not limited to the notebook usage mode, the panel computer usage mode, the tent usage mode and the standing usage mode, and other usage modes may be added according to requirements of users. Also, the sensing units are not limited to the first gravity sensor and the distance sensor, and other gravity sensors and distance sensors may be added in actual practice.

Figure 5:
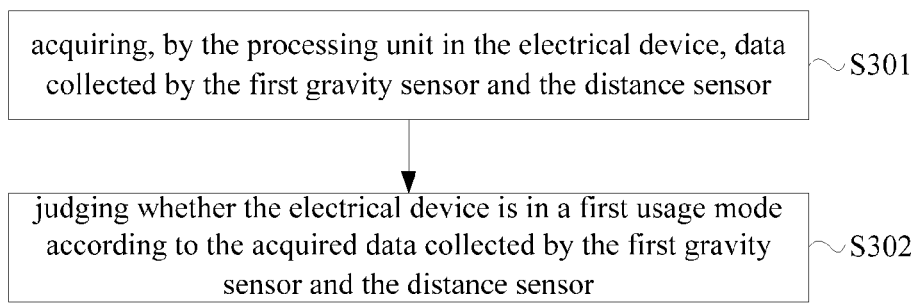
FIG. 5 is a third flow chart of an information processing method provided in the embodiments of the present disclosure.

As illustrated in FIG. 5, an information processing method comprises steps as follows.

In S301, acquiring, by the processing unit in the electrical device, data collected by the first gravity sensor and the distance sensor.

In the present embodiment, the collected data comprises at least a first included angle between a sensitive axis in the first gravity sensor with a gravity direction and a close distance to an object detected by the distance sensor. Wherein the distance sensor generally measures a distance with a principle of "Flight Time Method" so as to measure the close distance to the object. The called "Flight Time Method" transmits a short optical pulse, measures an internal from a time point at which the optical pulse is transmitted to a time point at which the optical pulse is reflected back, and calculates a distance to the object by the internal.

It may understand that the four usage modes correspond to three included angle ranges according to the first included angle collected by the first gravity sensor, as shown in the Table 1 and Table 2. That is to say, when the first gravity sensor is disposed on the first body, the notebook usage mode and the tent usage mode may be distinguished with each other exactly, but the standing usage mode and the panel computer usage mode can not be distinguished with each other. Therefore, in the present embodiment, it may dispose the first gravity sensor on the first body and dispose a distance sensor on a house of the second body, so that the panel computer usage mode and the standing usage mode may be further distinguished according to the distance to the first body collected by the distance sensor.

For example, the first gravity sensor may be disposed on the first body while the distance sensor may be disposed on the house of the second body. Wherein the first body is a host while the second body is a display; the direction of the sensitive axis in the first gravity sensor is a direction which is parallel to a thickness direction of the first body, and a positive direction is vertical to a usage surface of the first body inwardly; and the data collected by the distance sensor is a close distance to the first body. Wherein a corresponding relationship between a combination of the collected first included angles and the close distance to the first body with the usage modes is shown in Table 3.

TABLE 3

| Usage Mode | First Included Angle (°) | Close Distance to First Body |
| --- | --- | --- |
| Notebook | 0 | not equal to 0 |
| Panel Computer | 180 | 0 |
| Tent | 0~90 | not equal to 0 |
| Standing | 180 | not equal to 0 |

As known from the Table 3, the combinations of the first included angle and the close distance to the first body corresponding different usage modes are different, therefore the usage mode corresponding to a current application scene may be determined according to a preset corresponding relationship in the Table 3 after determining the first included angle and the close distance to the first body.

Also, the first gravity sensor may be disposed on the first body while the distance sensor may be disposed on the house of the second body. Wherein the first body is a host while the second body is a display; the direction of the sensitive axis in the first gravity sensor is a direction which is parallel to a thickness direction of the first body, and a positive direction is vertical to a usage surface of the first body inwardly; and the data collected by the distance sensor is a close distance to the first body. Wherein a corresponding relationship between a combination of the collected first included angles and the close distance to the first body with the usage modes is shown in Table 4.

TABLE 4

| Usage Mode | First Included Angle (°) | Close Distance to First Body |
| --- | --- | --- |
| Notebook | 180 | not equal to 0 |
| Panel Computer | 0 | 0 |
| Tent | 0~90 | not equal to 0 |
| Standing | 0 | not equal to 0 |

In S302, judging, whether the electrical device is in a first usage mode according to the acquired data collected by the first gravity sensor and the distance sensor.

Wherein the first usage mode is one of the plurality of the usage modes.

The usage mode corresponding to the current application scene of the electrical device may be judged according to the first included angle between the sensitive axis of the first gravity sensor and the gravity direction and the close distance to the first body collected by the distance sensor, after acquiring the first included angle and the close distance to the first body.

As shown in the Table 3 or Table 4, each of the combinations of the first included angle and the close distance to the first body corresponds uniquely one usage mode, therefore the usage mode corresponding to the current application scene may be judged according to the first included angle and the close distance to the first body after acquiring the first included angle and the close distance to the first body.

In the present embodiment, the electrical device has four usage modes and comprises at least the processing unit, the first gravity sensor and the distance sensor; during an operation process of the electrical device, the processing unit acquires data collected by the first gravity sensor and the distance sensor, and judges whether the electrical device is in one usage mode of the four usage modes according to the collected data. As compared with the prior art, the electrical device according to the present disclosure may set four usage modes and judge the usage mode corresponding to the current application scene according to the data collected by the first gravity sensor and the distance sensor.

Further, attributes of application programs may be adjusted according to the judged usage mode after judging the usage mode of the electrical device corresponding to the current application scene. With this regard, the embodiments of the present disclosure may further provide another information processing method.

It should note that an electrical device to which the information processing method provided in the present embodiment is applicable has a first body, a second body and a spin axis connecting the first body with the second body, the second body can rotate a degree of 360 with respect to the first body by means of the spin axis; and the electrical device has a processing unit, four usage modes and a plurality of sensing units. As illustrated in FIG. 2, the four usage modes in the electrical device may comprise a notebook computer usage mode, a panel computer usage mode, a tent usage mode and a standing usage mode. Meanwhile, the plurality of sensing units at least comprise a first gravity sensor and a second gravity sensor, or at least comprise a first gravity sensor and a distance sensor.

It should understand that the usage modes in the electrical device are not limited to the notebook usage mode, the panel computer usage mode, the tent usage mode and the standing usage mode, and other usage modes may be added according to requirements of users. Also, the sensing units are not limited to the first gravity sensor and the distance sensor, or the first gravity sensor and the distance sensor, and other sensors may be added in actual practice.

Figure 6:
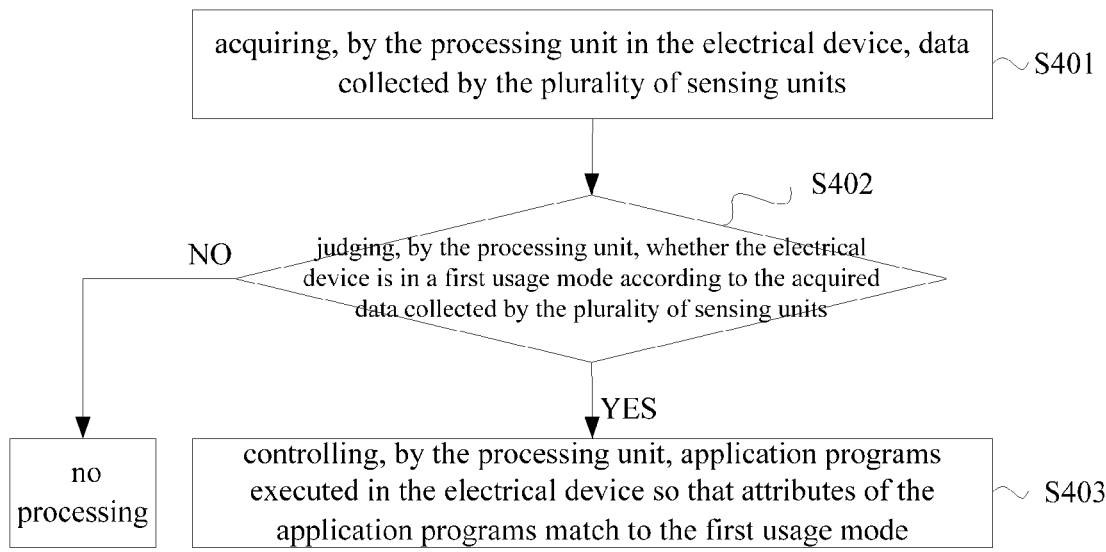
FIG. 6 is a fourth flow chart of an information processing method provided in the embodiments of the present disclosure.

As illustrated in FIG. 6, an information processing method comprises steps as follows.

In S401, acquiring, by the processing unit in the electrical device, data collected by the plurality of sensing units.

In S402, judging, by the processing unit, whether the electrical device is in a first usage mode according to the acquired data collected by the plurality of sensing units. If YES, a step S403 would be performed; otherwise, no processing is performed.

Wherein the collected data at least comprises a first included angle between a sensitive axis in the first gravity sensor with a gravity direction and a second included angle between a sensitive axis in the second gravity sensor with the gravity direction, when the plurality of sensing units at least comprise the first gravity sensor and the second gravity sensor. At this time, the process for judging whether the electrical device is in a first usage mode according to the acquired data collected by the plurality of sensing units is similar to the processes in step S201-step S202, so the details are omitted.

On the other hand, the collected data comprises at least a first included angle between a sensitive axis in the first gravity sensor with a gravity direction and a close distance to an object detected by the distance sensor, when the plurality of sensing units comprise at least the first gravity sensor and the distance sensor. At this time, the process for judging whether the electrical device is in a first usage mode according to the acquired data collected by the plurality of sensing units is similar to the processes in step S301-step S302, so the details are omitted.

In S403, controlling, by the processing unit, application programs executed in the electrical device so that attributes of the application programs match to the first usage mode.

Wherein the attributes of the application program may comprise a size of window, a text size of the application, display parameters, or a display direction and the like.

For example, when the first usage mode is the tent usage mode, controlling, by the processing unit, application programs executed in the electrical device is embodied as:

rotating the display direction of the application program, by the processing unit, so as to be coincident with viewing habits of users.

In the present embodiment, the electrical device has four usage modes and has the processing unit and the plurality of sensing units; the attributes of the current application program are adjusted to be matched to the determined usage mode after the processing unit judges the usage mode corresponding to the current application scene according to the data collected by the sensing units, so that the current application program is coincident with viewing habits of users.

Additionally, operation states of corresponding peripheral units may be adjusted according to the judged usage mode after judging the usage mode of the electrical device corresponding to the current application scene, in order to achieve an object of utilizing peripheral unit efficiently. With this regard, the embodiments of the present disclosure may further provide another information processing method.

It should note that an electrical device to which the information processing method provided in the present embodiment is applicable has a first body, a second body and a spin axis connecting the first body with the second body, the second body can rotate a degree of 360 with respect to the first body by means of the spin axis; and the electrical device has a processing unit, four usage modes and a plurality of sensing units and peripheral units. As illustrated in FIG. 2, the four usage modes in the electrical device may comprise a notebook computer usage mode, a panel computer usage mode, a tent usage mode and a standing usage mode. Meanwhile, the plurality of sensing units at least comprise a first gravity sensor and a second gravity sensor, or at least comprise a first gravity sensor and a distance sensor. Those skilled in the art may understand that entities corresponding to the peripheral units may comprise a camera, a physical keyboard, etc.

It should understand that the usage modes in the electrical device are not limited to the notebook usage mode, the panel computer usage mode, the tent usage mode and the standing usage mode, and other usage modes may be added according to requirements of users. Also, the sensing units are not limited to the first gravity sensor and the distance sensor, or the first gravity sensor and the distance sensor, and other sensors may be added in actual practice.

Figure 7:
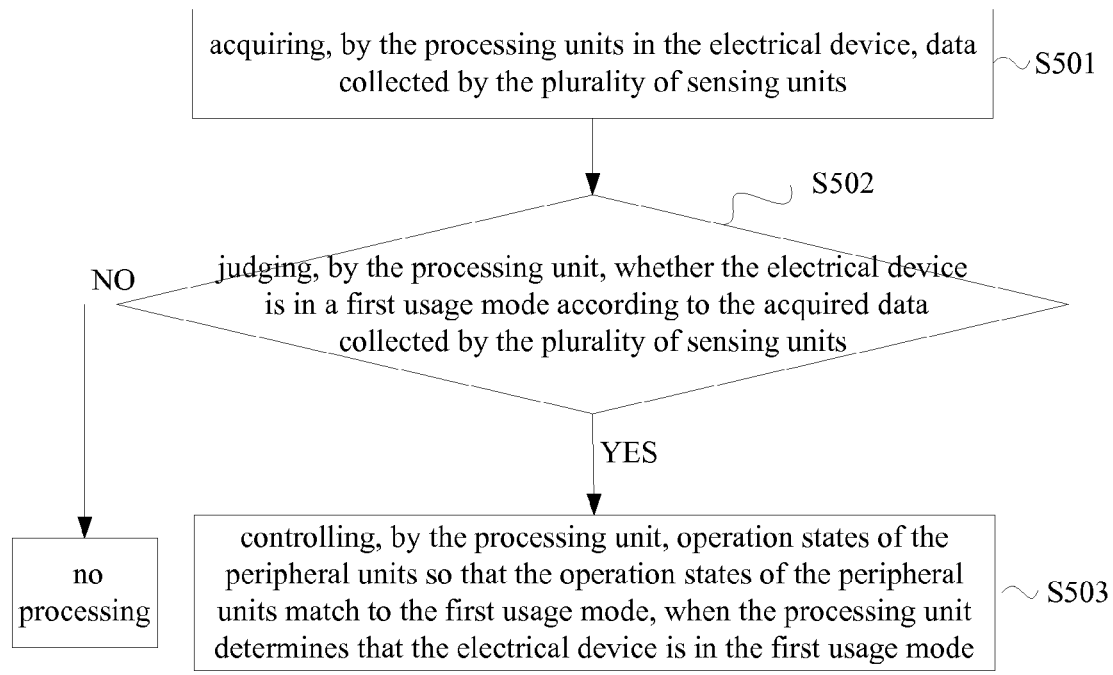
FIG. 7 is a fifth flow chart of an information processing method provided in the embodiments of the present disclosure.

As illustrated in FIG. 7, an information processing method comprises steps as follows.

In S501, acquiring, by the processing unit in the electrical device, data collected by the plurality of sensing units.

In S502, judging, by the processing unit, whether the electrical device is in a first usage mode according to the acquired data collected by the plurality of sensing units. If YES, a step S503 would be performed; otherwise, no processing is performed.

Wherein the collected data at least comprises a first included angle between a sensitive axis in the first gravity sensor with a gravity direction and a second included angle between a sensitive axis in the second gravity sensor with the gravity direction, when the plurality of sensing units at least comprise the first gravity sensor and the second gravity sensor. At this time, the process for judging whether the electrical device is in a first usage mode according to the acquired data collected by the plurality of sensing units is similar to the processes in step S201-step S202, so the details are omitted.

On the other hand, the collected data comprises at least a first included angle between a sensitive axis in the first gravity sensor with a gravity direction and a close distance to an object detected by the distance sensor, when the plurality of sensing units comprise at least the first gravity sensor and the distance sensor. At this time, the process for judging whether the electrical device is in a first usage mode according to the acquired data collected by the plurality of sensing units is similar to the processes in step S301-step S302, so the details are omitted.

In S503, controlling, by the processing unit, operation states of the peripheral units so that the operation states of the peripheral units match to the first usage mode, when the processing unit determines that the electrical device is in the first usage mode.

Wherein the operation states may comprise an enable state, a disable state, a power-saving state, etc.

Particularly, when it is judged that the usage mode of the electrical device corresponding to the current application scene is the panel computer usage mode, the physical keyboard may be set as the disable state so as to avoid a misoperation caused by contact with fulcrums; and when it is judged that the usage mode of the electrical device corresponding to the current application scene is the tent usage mode, the camera may be set as the disable state and a touch application mode of the screen may be initiated.

In the present embodiment, the electrical device has four usage modes and has the processing unit and the plurality of sensing units; the operation state of the current peripheral unit is controlled to be matched to the determined usage mode after the processing unit judges the usage mode corresponding to the current application scene according to the data collected by the sensing units, so that the peripheral unit is utilized efficiently.

Further, an Operating System of the electrical device may be adjusted according to the first usage mode after judging that the electrical device is in the first usage mode, in order to being further coincident with the requirements of the current application scene. With this regard, the embodiments of the present disclosure may further provide another information processing method.

It should note that an electrical device to which the information processing method provided in the present embodiment is applicable has a first body, a second body and a spin axis connecting the first body with the second body, the second body can rotate a degree of 360 with respect to the first body by means of the spin axis; and the electrical device has a processing unit, four usage modes, a plurality of sensing units and peripheral units. As illustrated in FIG. 2, the four usage modes in the electrical device may comprise a notebook computer usage mode, a panel computer usage mode, a tent usage mode and a standing usage mode. Meanwhile, the plurality of sensing units at least comprise a first gravity sensor and a second gravity sensor, or at least comprise a first gravity sensor and a distance sensor.

It should understand that the usage modes in the electrical device are not limited to the notebook usage mode, the panel computer usage mode, the tent usage mode and the standing usage mode, and other usage modes may be added according to requirements of users. Also, the sensing units are not limited to the first gravity sensor and the distance sensor, or the first gravity sensor and the distance sensor, and other sensors may be added in actual practice.

Figure 8:
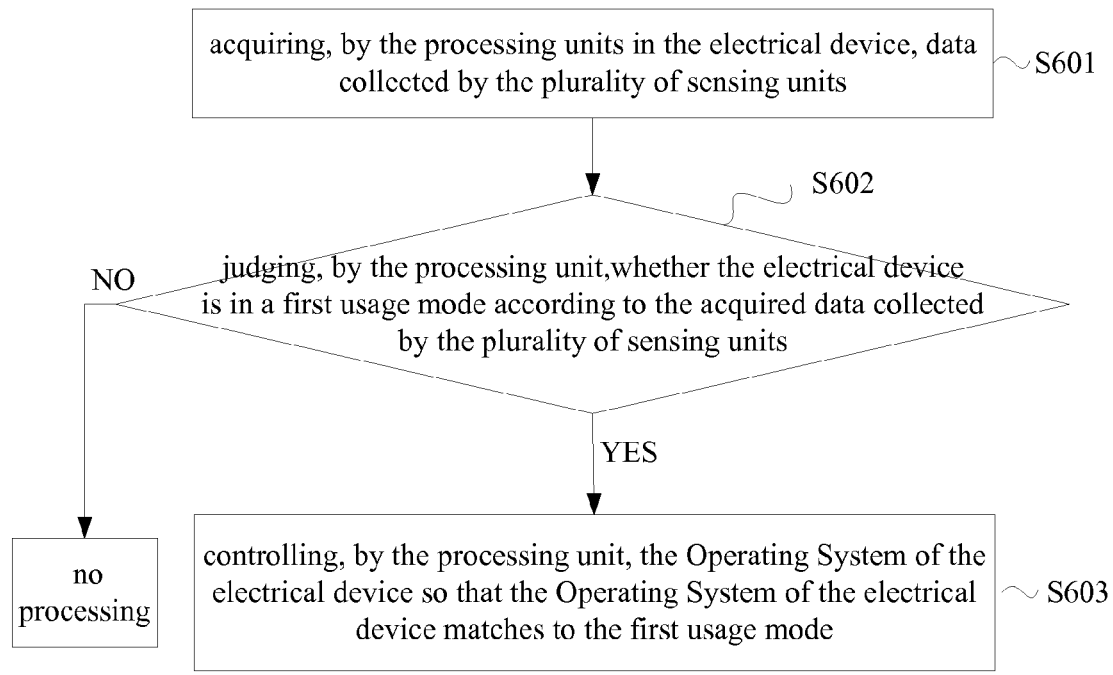
FIG. 8 is a sixth flow chart of an information processing method provided in the embodiments of the present disclosure.

As illustrated in FIG. 8, an information processing method comprises steps as follows.

In S601, acquiring, by the processing unit in the electrical device, data collected by the plurality of sensing units.

In S602, judging, by the processing unit, whether the electrical device is in a first usage mode according to the acquired data collected by the plurality of sensing units. If YES, a step S603 would be performed; otherwise, no processing is performed.

Wherein the collected data at least comprises a first included angle between a sensitive axis in the first gravity sensor with a gravity direction and a second included angle between a sensitive axis in the second gravity sensor with the gravity direction, when the plurality of sensing units at least comprise the first gravity sensor and the second gravity sensor. At this time, the process for judging whether the electrical device is in a first usage mode according to the acquired data collected by the plurality of sensing units is similar to the processes in step S201-step S202, so the details are omitted.

On the other hand, the collected data comprises at least a first included angle between a sensitive axis in the first gravity sensor with a gravity direction and a close distance to an object detected by the distance sensor, when the plurality of sensing units comprise at least the first gravity sensor and the distance sensor. At this time, the process for judging whether the electrical device is in a first usage mode according to the acquired data collected by the plurality of sensing units is similar to the processes in step S301-step S302, so the details are omitted.

In S603, controlling, by the processing unit, the Operating System of the electrical device so that the Operating System of the electrical device matches to the first usage mode when it is determined that the electrical device is in the first usage mode.

It should noted that, when the first usage mode is the panel computer usage mode, the electrical device generally requires an Intelligent operating system because the panel usage mode has requirement of touch application. At this time, controlling, by the processing unit, the Operating System of the electrical device may be embodied as:

switching the Operating System run in the electrical device currently to an Android Operating System.

On the other hand, when the first usage mode is the notebook usage mode, a Windows system may satisfy the usage requirements of users. At this time, controlling, by the processing unit, the Operating System of the electrical device may be embodied as:

switching the Operating System run in the electrical device currently to a Windows Operating System.

In the present embodiment, the electrical device has four usage modes and has the processing unit and the plurality of sensing units; the current Operating System are adjusted to be matched to an Operating System matching the determined usage mode after the processing unit judges the usage mode corresponding to the current application scene according to the data collected by the sensing units, so that the current Operating System is coincident with the current application scene.

Figure 9:
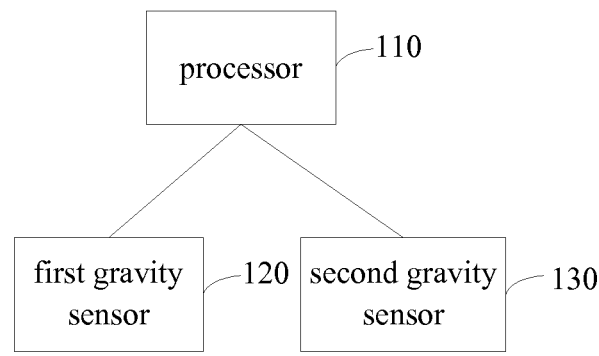
FIG. 9 is an exemplary view illustrating a first structure of the electrical device provided in the embodiments of the present disclosure.

Accordingly, the embodiments of the present disclosure further provide an electrical device, the electrical device has a first body, a second body and a spin axis connecting the first body with the second body, the second body can rotate a degree of 360 with respect to the first body by means of the spin axis;

the electrical device has a plurality of usage modes and, as illustrated in FIG. 9, comprises a processor 110 and at least two gravity sensors, wherein the at least two gravity sensors comprise a first gravity sensor 120 disposed at the first body and a second gravity sensor 130 disposed at the second body;

the first gravity sensor 120 is configured to collect a first included angle between a sensitive axis in the first gravity sensor 120 with a gravity direction, when the second body rotates with respect to the first body;

the second gravity sensor 130 is configured to collect a second included angle between a sensitive axis in the second gravity sensor 130 with the gravity direction, when the second body rotates with respect to the first body;

the processor 110 is configured to judge whether the electrical device is in a first usage mode according to the acquired first included angle and second included angle, wherein the first usage mode is one of the plurality of usage modes.

It should note that the electrical device may be a notebook computer, a mobile phone, etc, and the plurality of usage modes may comprise a notebook usage mode, a panel computer usage mode, a tent usage mode and a standing usage mode but of course is not limited thereto.

With the electrical device provided by the embodiments of the present disclosure, objects of integrating the plurality of usage modes into one electrical device and judging the usage mode corresponding to the current application scene efficiently are realized.

Figure 10:
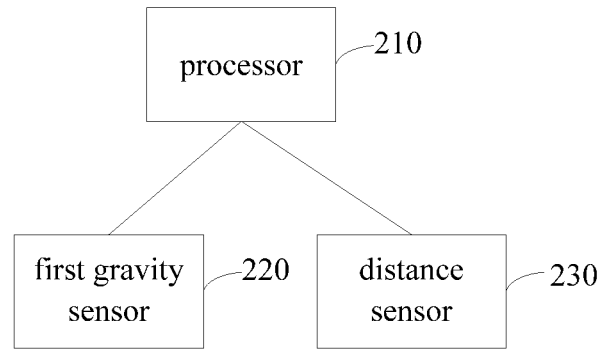
FIG. 10 is an exemplary view illustrating a second structure of the electrical device provided in the embodiments of the present disclosure.

Accordingly, the embodiments of the present disclosure further provide an electrical device, the electrical device has a first body, a second body and a spin axis connecting the first body with the second body, the second body can rotate a degree of 360 with respect to the first body by means of the spin axis;

the electrical device has a plurality of usage modes and, as illustrated in FIG. 10, comprises at least a processor 210, at least one first gravity sensor 220 disposed at the first body and at least one distance sensor 230 disposed at the second body;

the first gravity sensor 220 is configured to collect a first included angle between a sensitive axis in the first gravity sensor 220 with a gravity direction, when the second body rotates with respect to the first body;

the distance sensor 230 is configured to collect a close distance to an object, when the second body rotates with respect to the first body;

the processor 210 is configured to judge whether the electrical device is in a first usage mode according to the acquired first included angle and close distance to an object, wherein the first usage mode is one of the plurality of usage modes.

It should note that the electrical device may be a notebook computer, a mobile phone, etc, and the plurality of usage modes may comprise a notebook usage mode, a panel computer usage mode, a tent usage mode and a standing usage mode but of course is not limited thereto.

With the electrical device provided by the embodiments of the present disclosure, objects of integrating the plurality of usage modes into one electrical device and judging the usage mode corresponding to the current application scene efficiently are realized.

Furthermore, on a basis of the two electrical devices provided in the embodiments of the present disclosure, the electrical device may adopt an IPS capacitive touch screen of 13.3 inch, in order to ensure a wide angle of view for the electrical device and satisfy a requirement of being viewed by several persons in turn; a power supply interface at a side of the body may be configured as a shape of rectangle so as to reduce a thickness of the body efficiently; the electrical device may adopt a ten-touch capacitive screen touch technique so as to realize a multi-touch and satisfy some special applications (such as a piano); the electrical device may be equipped with a Windows 8 Operating System (Beta) due to its touch characters; if the electrical device is the notebook computer, it may be configured as having an ultra thin body of 16.9 mm and weighing 1.47 Kg for portability; in order to return a main interface of the electrical device rapidly as running a program during the use process of the panel computer, a "Win" key may be set on a hinge of the electrical device in order to switch the main interface rapidly.

Meanwhile, the electrical device may adopt an underlying acceleration technique of EE2.0 to support being wakened rapidly within 2 seconds, thus the electrical device can be carried easily, used once powered-on and connect to the Internet at any time; in terms of its hardware configuration, the electrical device may assemble a new third generation Core i7 processor of an Intel Ivy Bridge platform, and be configured to have a storage capacity of a 8 GB RAM and a 256 GB SSD, so that it is better than a product having an ARM architecture considering performances in entertainment and office; in terms of interfaces, the electrical device may be equipped with one USB2.0 interface and one USB3.0 interface and select a HDMI interface to complete a task for outputting video and/or audio, than the electrical device also has the necessary multi-function card reader and earphone/microphone socket.

The embodiments of the present disclosure may further provide an information processing method to determine an included angle between a first body in the electrical device and a level plane and/or an included angle between a second body in the electrical device and the level plane, and perform specified processing based on the determined included angles.

It should note that the information processing method provided by the embodiments of the present disclosure is applicable to an electrical device at least having a processing unit, a first body, a second body and a spin axis connecting the first body with the second body; and the electrical device may comprise a plurality of sensing units.

As illustrated in FIG. 11, an information processing method may comprise steps as follows.

In S701, acquiring, by the processing unit in the electrical device, data collected by the plurality of the sensing units.

In an operation process of the electrical device, the plurality of sensing units disposed in the electrical device collect corresponding data for the electrical device real-time, and the processing unit in the electrical device acquires the data collected by the plurality of sensing units real-time and performs subsequent processing according to the collected data.

It may understand that a gravity sensor is generally used as the sensing unit in practice because the subsequent processing needs to determine the included angle between the first body in the electrical device and the level plane and/or the included angle between the second body in the electrical device and the level plane, and the included angle between the current body and a positive level direction according to the collected sensitive axis and the gravity direction. Of course, the sensing unit is not limited to the gravity sensor and other sensors for determining information on the included angles may also be used.

In S702, judging, by the processing unit, the included angle between the first body and the level plane and/or the included angle between the second body and the level plane according to the acquired data collected by the plurality of sensing units.

The processing unit judges the included angle between the first body and the level plane and/or the included angle between the second body and the level plane in the current application scene according to the acquired data collected by the plurality of sensing units, after acquiring the data collected by the plurality of the sensing units.

It should note that a positive direction corresponding to the level direction may be determined previously so as to determine a uniform standard for judging included angle, when the included angle between the body and the level plane is determined.

In the present embodiment, a plurality of sensing units are disposed previously in the electrical device, and during the execution process of the electrical device, the processing unit acquires data collected by the sensing units real-time, and judges the included angle between the first body and the level plane and/or the included angle between the second body and the level plane according to the collected data, and in turn may perform specified processing with the determined included angle.

Below will describe the above information processing method provided in the present invention in connection with detailed embodiments.

It should note that an electrical device to which the information processing method provided in the embodiments of the present disclosure is applicable at least has a processing unit, a first body, a second body and a connection part connecting the first body with the second body; and the electrical device further comprises a first gravity sensors and a second gravity sensor. Wherein the first gravity sensor may be disposed on the first body, and the second gravity sensor may be disposed on the second body. Those skilled in the art may understand that the disposition positions of the first gravity sensor and the second gravity sensor are not limited to the positions illustrated in the present embodiment; meanwhile the plurality of sensing units are not limited to the first gravity sensor and the second gravity sensor, and other gravity sensors may be added on the first body and/or the second body in actual practice.

As illustrated in FIG. 12, an information processing method comprises steps as follows.

In S801, acquiring, by the processing unit in the electrical device, data collected by the first gravity sensor and the second gravity sensor.

In the present embodiment, the collected data comprises at least a first included angle between a sensitive axis in the first gravity sensor with a gravity direction and a second included angle between a sensitive axis in the second gravity sensor with the gravity direction.

It should understand that the collected included angles would be different if a direction of the sensitive axis is set differently. For example, the direction of the sensitive axis in the first gravity sensor may be set as a direction which is parallel to a thickness direction of the first body, and a positive direction is vertical to a usage surface of the first body inwardly; or the direction of the sensitive axis in the first gravity sensor may be set as a direction which is parallel to a thickness direction of the first body, and a positive direction is vertical to a usage surface of the first body outwardly. The first included angles corresponding to the two set directions of the sensitive axis are different.

In S802, judging, by the processing unit, the included angle between the first body and the level plane and/or the included angle between the second body and the level plane according to the acquired data collected by the first gravity sensor and the second gravity sensor.

The processing unit judges the included angle between the first body and the level plane and/or the included angle between the second body and the level plane after acquiring the first included angle between the sensitive axis in the first gravity sensor with the gravity direction and the second included angle between the sensitive axis in the second gravity sensor with the gravity direction.

It should note that a positive direction corresponding to the level direction may be determined previously so as to determine a uniform standard for judging included angle, when the included angle between the body and the level plane is determined.

In the present embodiment, the first gravity sensor is disposed on the first body and the second gravity sensor is disposed on the second body, and during the execution process of the electrical device, the processing unit acquires data collected by the sensing units real-time, and judges the included angle between the first body and the level plane and/or the included angle between the second body and the level plane according to the collected data, and in turn may perform specified processing with the determined included angle.

The embodiments of the present disclosure may further provide an information processing method, so that a current application program is coincident with viewing habits of users in a case that the electrical device has a plurality of usage modes.

It should note that an electrical device to which the information processing method provided in the present embodiment is applicable at least has a processing unit; and the electrical device has a plurality of usage modes.

As illustrated in FIG. 13, an information processing method comprises steps as follows.

In S901, judging, by the processing unit of the electrical device, whether the electrical device is in a first usage mode. If YES, a step S902 would be performed; otherwise, no processing is performed.

Wherein the first usage mode is one of the plurality of the usage modes, and an Application program of the electrical device corresponds to specified attributes in the first usage mode. For example, the electrical device has the four usage modes as described above: the notebook usage mode, the panel computer usage mode, the tent usage mode and the standing usage mode. Since a screen direction of the tend usage mode is rotated as compared with other usage modes, attributes of current application program are required to be adjusted so as to be coincident with viewing habits of users, after determining that the electrical device is in the tent usage mode.

Wherein, the process for judging whether the electrical device is in a first usage mode may comprise: disposing at least a first gravity sensor and a second gravity sensor on the electrical device, and in turn judging whether the electrical device is in the first usage mode, according to the collected the first included angle between the sensitive axis in the first gravity sensor with the gravity direction and the second included angle between the sensitive axis in the second gravity sensor with the gravity direction, the detailed processing may refer to the step S201-step S202. Alternatively, the process for judging whether the electrical device is in a first usage mode may comprise: disposing at least a first gravity sensor and a distance sensor on the electrical device, and in turn judging whether the electrical device is in the first usage mode, according to the first included angle between the sensitive axis in the first gravity sensor with the gravity direction and a close distance to an object detected by the distance sensor, the detailed processing may refer to the step S301-step S302.

Those skilled in the art may understand that the method for judging whether the electrical device is in a first usage mode is not limited to the methods illustrated in the present embodiment, and other methods may be adopted in practice.

In S902, controlling application program executed in the electrical device, so that attributes of the application program match to the first usage mode.

Wherein the attributes of the application program may comprise a size of window, a text size of the application, display parameters, or a display direction and the like.

After judging that the electrical device is in the first usage mode, the attributes of the current application program are required to be adjusted, so that the attributes of the current application program match to the first usage mode so as to be coincident with viewing habits of users. For example, when the first usage mode is the tent usage mode, controlling, by the processing unit, application programs executed in the electrical device may be embodied as:

rotating the display direction of the application program, by the processing unit, so as to be coincident with viewing habits of users.

In the present embodiment, a plurality of usage modes are configured in the electrical device. The attributes of the current application program are adjusted to be matched to the first usage mode after it is judged that the usage mode of the electrical device corresponding to the current application scene, so that the current application program is coincident with viewing habits of users.

The embodiments of the present disclosure further provide an information processing method in which operation states of peripheral unit match to the usage mode corresponding to the current scene in a case that the electrical device has a plurality of usage modes.

It should note that an electrical device to which the information processing method provided in the present embodiment at least has a processing unit; and the electrical device has a plurality of usage modes and peripheral units.

Figure 14:
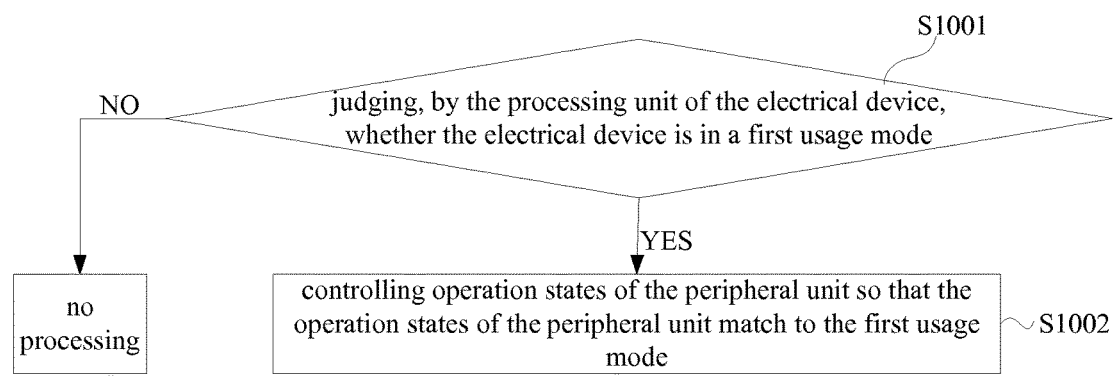
FIG. 14 is a tenth flow chart of an information processing method provided in the embodiments of the present disclosure.

As illustrated in FIG. 14, an information processing method comprises steps as follows.

In S1001, judging, by the processing unit of the electrical device, whether the electrical device is in a first usage mode. If YES, a step S1002 would be performed; otherwise, no processing is performed.

Wherein the first usage mode is one of the plurality of the usage modes. And, in the first usage mode, the peripheral units of the electrical device correspond to specified operation states. For example, the electrical device has the four usage modes as described above: the notebook usage mode, the panel computer usage mode, the tent usage mode and the standing usage mode. In the panel computer usage mode, a physical keyboard area contacts with fulcrums, so misoperations would occur easily, thus the physical keyboard is need to be set as a disable state so as to avoid the misoperations after the electrical device is judged as in the panel computer usage mode.

Wherein the process of judging whether the electrical device is in a first usage mode is similar to the step S901 in the above described embodiment, and details are omitted herein.

In S1002, controlling operation states of the peripheral unit so that the operation states of the peripheral unit match to the first usage mode.

Wherein the operation states may comprise an enable state, a disable state, a power-saving state, etc.

Particularly, when it is judged that the usage mode of the electrical device corresponding to the current application scene is the panel computer usage mode, the physical keyboard may be set as the disable state so as to avoid a misoperation caused by contacts with fulcrums; and when it is judged that the usage mode of the electrical device corresponding to the current application scene is the tent usage mode, the camera may be set as the disable state.

In the present embodiment, the electrical device has plurality of usage modes; the operation state of the current peripheral unit is controlled to be matched to the determined usage mode after the processing unit judges the usage mode corresponding to the current application scene, so that the peripheral unit is utilized efficiently.

The embodiments of the present disclosure further provide an information processing method in which Operating System match to the usage mode corresponding to the current scene in a case that the electrical device has a plurality of usage modes.

It should note that an electrical device to which the information processing method provided in the present embodiment at least has a processing unit; and the electrical device has a plurality of usage modes.

Figure 15:
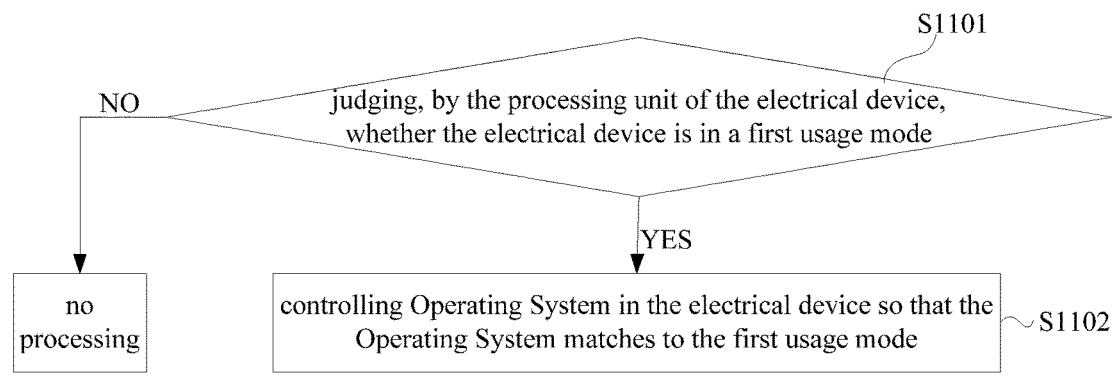
FIG. 15 is an eleventh flow chart of an information processing method provided in the embodiments of the present disclosure.

As illustrated in FIG. 15, an information processing method comprises steps as follows.

In S1101, judging, by the processing unit of the electrical device, whether the electrical device is in a first usage mode. If YES, a step S1102 would be performed; otherwise, no processing is performed.

Wherein the first usage mode is one of the plurality of the usage modes.

Wherein the process of judging whether the electrical device is in a first usage mode is similar to the step S901 in the above described embodiment, and details are omitted herein.

In S1102, controlling Operating System in the electrical device so that the Operating System matches to the first usage mode.

Since requirements in Operating System required in different usage modes are different, the Operating System may be switched to one matching to the current usage mode after determining the first usage mode in which the electrical device is.

For example, when the first usage mode is the panel computer usage mode, the panel computer usage mode generally requires an Intelligent operating system, therefore at this time, controlling, by the processing unit, the Operating System of the electrical device may be embodied as:

switching, by the processing unit, the Operating System run in the electrical device currently to an Android Operating System.

On the other hand, when the first usage mode is the notebook usage mode, a Windows system may satisfy the usage requirements of users. At this time, controlling, by the processing unit, the Operating System of the electrical device may be embodied as:

switching, by the processing unit, the Operating System run in the electrical device currently to a Windows Operating System.

In the present embodiment, the electrical device has four usage modes and has the processing unit and the plurality of sensing units; the current Operating System is adjusted to an Operating System matching the determined usage mode after the processing unit judges the usage mode corresponding to the current application scene according to the data collected by the sensing units, so that the current Operating System is coincident with the requirements in the current application scene.

Figure 16:
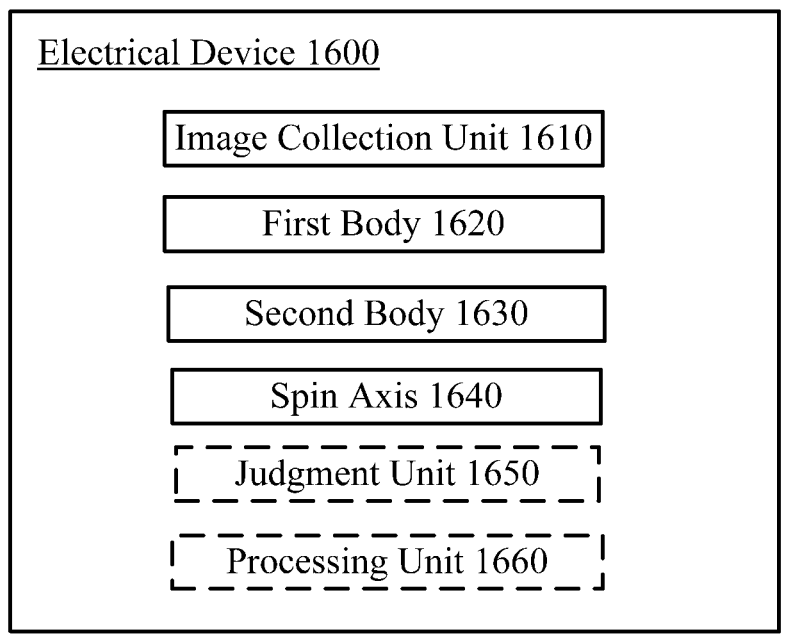
FIG. 16 is a block diagram of the electrical device according to the embodiment of the present disclosure.

FIG. 16 is a block diagram illustrating an electrical device 16 according to the embodiments of the present disclosure. The electrical device 16 comprises: an image collection unit 1610; a first body 1620, on which a display unit is disposed; a second body 1630; and a spin axis 1640 for connecting the first body with the second body, wherein the first body 1620 can rotate a degree of 360 with respect to the second body 1630 by means of the spin axis 1640. In the electrical device 1600, by making the first body 1620 to rotate the degree of 360 with respect to the second body 1630 by means of the spin axis 1640, the electrical device 1600 may have different usage modes applicable to different scenes.

Optically, as illustrated by a dotted box in FIG. 16, the electrical device 1600 further comprises: a judgment unit 1650 for judging the usage mode in which the electrical device is and generating a judgment result; and a processing unit 1660 for driving the image collection units according to the judgment result.

As an example, the electrical device 1600 may be a notebook computer, a flip mobile communication terminal, an electrical dictionary, a video playing terminal, etc. Following description makes the notebook computer as an example briefly.

Figure 17:
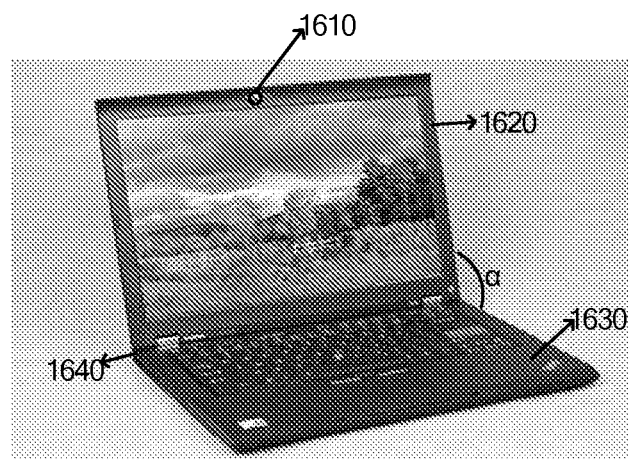
FIG. 17 exemplarily illustrates respective parts of a notebook computer according to the embodiment of the present disclosure.
Figure 18:
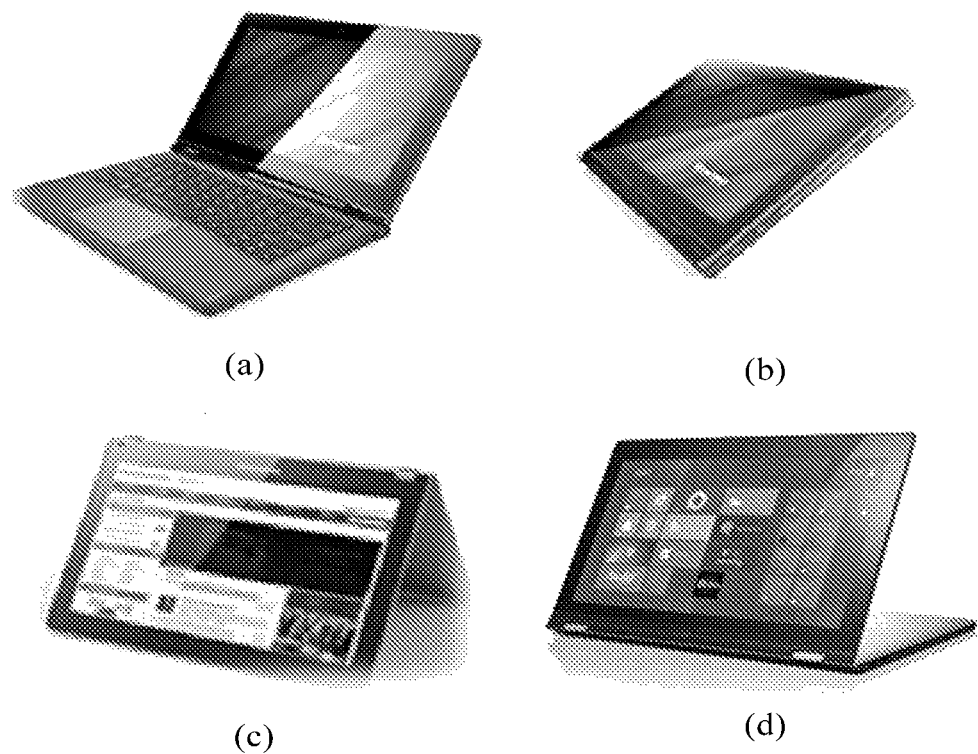
FIGS. 18a to 18d exemplarily illustrate the four usage modes in the notebook computer according to the embodiment of the present disclosure.

FIG. 17 exemplarily illustrates respective parts of a notebook computer according to the embodiment of the present disclosure. In the notebook computer of FIG. 17, the first body 1620 may be a constitute part having a display unit, the second body 1630 may be a constitute part having a keyboard, the image collection unit 1610 is generally located on a top side of the display unit in the first body 1620, and the spin axis 1640 is located in a common side between the first body 1620 and the second body 1630. The first body 1620 and the second body 1630 may be connected with each other via the spin axis 1640, and an included angle α therebetween may change within a range of 0°-360°, so that the notebook computer may has a plurality of usage modes.

The first body 1620 may have a first surface on which the display unit is located and a second surface being opposite to the first surface, and the second body 1630 may have a third surfacing comprising an input apparatus and a fourth surface being opposite to the third surface. An included angle between the first surface and the third surface is the above included angle α which may change within a range of 0°-360°.

FIGS. 18a to 18d exemplarily illustrate the four usage modes in the notebook computer according to the embodiment of the present disclosure. The four usage modes are formed by rotating the first body 1620 by degree of 360 with respect to the second body 1630, and comprise: a notebook mode (FIG. 18a) wherein the included angle between the first surface and the third surface is within a range of 0°-180°; a panel mode (FIG. 18b) wherein the included angle is 360°; a tend mode (FIG. 18c) wherein the included angle is within a range of 180°-360° and the common side between the first surface and the third surface goes up; and a standing mode (FIG. 18d) wherein the included angle is within a range of 180°-360° and the third surface faces downwards. Furthermore, the display unit in the first body 1620 may has a touch screen so as to manipulate the electrical device in different usage modes.

The notebook mode and the panel mode are used in case that the electrical device is considered as a notebook computer and a panel computer, respectively, the usage scenes thereof are common known and details are omitted herein.

The tent mode may be applied typically in a case that a use views video, pictures, etc using the notebook computer. In the tent mode, the notebook computer may be placed on a table stably without any brackets and a heavy burden of hands is released, and one can view the screen clearly without stretching out his/her neck which may be better for people's cervical vertebras. Furthermore, when the notebook compute in the tent mode has a touch screen, one can operate by hands naturally and such operation would not lead to shakes of the touch screen, unlike in the notebook mode. The standing mode is typically suitable for a case that the user explain his/her project to others. In the standing mode, the notebook computer may stand on, for example, the table, and the user may present his/her project to others via the display screen without supporting the displaying screen by hands.

Figure 19:
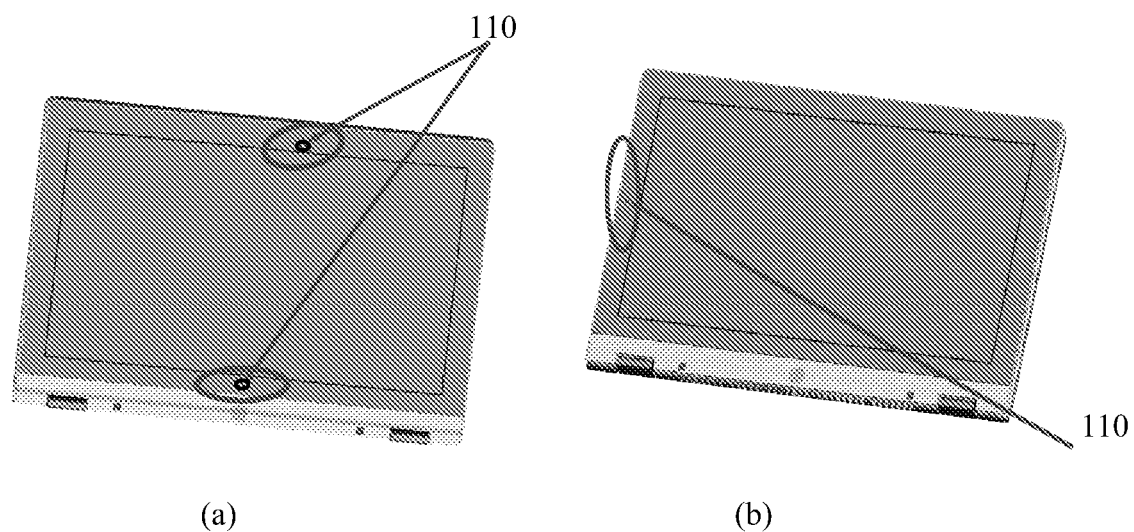
FIGS. 19a and 19b exemplarily illustrate a disposition of image collection units on the notebook computer according to the embodiment of the present disclosure.

Thereafter will describe an implementation of image collection function in the notebook computer according to the embodiment of the present disclosure in connection with FIG. 19. FIG. 19a and 19b exemplarily illustrate a disposition of image collection units on the notebook computer according to the embodiment of the present disclosure.

The image collection unit 1610 in the notebook computer may be a plurality of image collection units at least comprising a first image collection unit and a second image collection unit, the first image collection unit and the second image collection unit are disposed on two edges opposite each other of the display unit, respectively. As illustrated in FIG. 19a, the first image collection unit and the second image collection unit may locate on middle portion of top edge and bottom edge of the display unit in the notebook computer, respectively. Further, the first image collection unit and the second image collection unit may also locate on left edge and right edge of the display unit in the notebook computer, respectively, and are not required to be the middle portion. Any image collection unit may shift left-and-right or up-and-down with respect to its position on the edge. Please note, the image collection unit 1610 may comprise more than two image collection units, in order to realize a perfect image collection effect in different usage modes of the electrical device, and at least one of the image collection units may be rotated. During collecting images, the image collection units may be disposed around the display unit distributely and controlled to be rotated according to features of the respective usage modes.

The image collection unit 1610 of the notebook computer may be a single image collection unit, and the single image collection unit is disposed on one of two sides of the display unit. As illustrated in FIG. 4, the single image collection unit may locate on a middle portion of the left edge of the display unit in the notebook computer. Furthermore, the single image collection unit may also locate on the right edge of the display unit in the notebook computer and is not required to be the middle portion. The single image collection unit may shift up-and-down with respect to its position on the edge.

Below will describe how to collect the images in the different usage modes of the notebook computer with respect to the disposition of the image collection units shown in FIG. 19a and FIG. 19b.

In a case that the first image collection unit and the second image collection unit in the image collection unit 1610 are disposed on two edges opposite each other of the display unit, respectively, it is assumed that the first image collection unit is disposed on a top side, which is far away from the common side, of the display unit, and the second image collection unit is disposed on a bottom side, which is near to the common side, of the display unit. The notebook computer may further comprise: a judgment unit for judging the usage mode in which the electrical device is and generating a judgment result; and a processing unit for driving the at least one of the plurality of the image collection units in the operation state according to the judgment result. Any one of the image collection units may rotate so as to change direction for collecting the images. If the first image collection unit and the second image collection unit are located on left side and right side of the display unit, respectively, only one of them may be used to collect the images. Therefore an appropriate image collection unit is driven to collect the images in the different usage modes, thus a perfect effect of image collection is ensured.

When the judgment result indicates that the notebook computer is in the notebook mode or the standing mode, the first image collection unit, which is far away from the common side, is in an operation state while the second image collection unit, which is near to the common side, is in a close state; when the judgment result indicates that the electrical device is in the tent mode, the first image collection unit is in the close state while the second image collection unit is in the operation state; and when the judgment result indicates that the electrical device is in the panel mode or the standing mode, at least one of the first image collection unit and the second image collection unit is in the operation state.

When both of the first image collection unit and the second image collection unit are used at the same time to collect the images, the images collected by the first image collection unit and the second image collection unit may be synthesized to generate three-dimension images, thus a spatial effect of the image collected is realized.

In a case that the notebook computer adopts a single image collection unit, the single image collection unit is rotatable. At this time, the judgment unit in the notebook computer may judge a usage mode in which the electrical device is, and generate a judgment result. The processing unit in the notebook computer may rotate the single image collection unit according to the judgment result, so that the orientation of the single image collection unit matches to the usage mode in which the electrical device is. Furthermore, the single image collection unit may be composed of at least two pickup elements having different image collection scope, in order to enhance the image collection effect of the single image collection unit. At this time, the images collected by the two pickup elements may be synthesized. Those skilled in the art may realize the synthesis in various manners according to actual requirements, and their details are omitted herein.

In the above electrical device according to the embodiments of the present disclosure, by making the first body rotate a degree of 360 with respect to the second body, the electrical device has a plurality of usage modes and is convenient for being used in different scenes, thus user experiences are promoted. Furthermore, in the electrical device having the plurality of usage modes, the image collection units are driven differently for the different usages, thus an image collection function is performed optically in the different usage modes.

Figure 20:
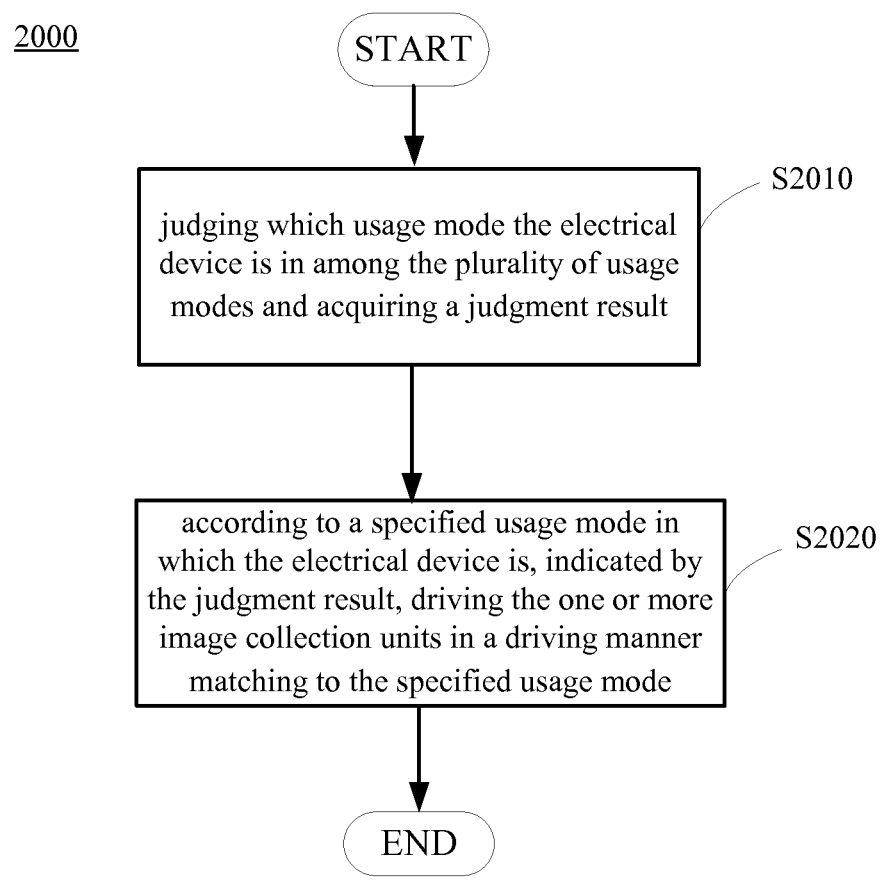
FIG. 20 is a flow chart illustrating a method for driving the image collection unit according to the embodiments of the present disclosure.

FIG. 20 is a flow chart illustrating a method 2000 for driving the image collection unit according to the embodiments of the present disclosure. The method 2000 for driving the image collection unit is applied to the electrical device 1600 described above. In particularly, the electrical device comprises the image collection unit, a first body on which a display unit is disposed, a second body and a spin axis connecting the first body with the second body, the first body can rotate a degree of 360 with respect to the second body by means of the spin axis, the image collection unit comprises one or more image collection units, and the electrical device has a plurality of usage modes. The method 2000 for driving the image collection unit comprises: judging which usage mode the electrical device is in among the plurality of usage modes and acquiring a judgment result step S2010); and according to a specified usage mode in which the electrical device is, indicated by the judgment result, driving the one or more image collection units in a driving manner matching to the specified usage mode (step S2020).

As an example, the electrical device 1600 may be a notebook computer, a flip mobile communication terminal, an electrical dictionary, a video playing terminal, etc.

As described previously, the first body may have a first surface on which the display unit is located and a second surface being opposite to the first surface, and the second body may have a third surfacing comprising an input apparatus and a fourth surface being opposite to the third surface. The first body may rotate a degree of 360 with respect to the second body so that the electrical device has a plurality of usage modes. The usage modes may comprises at least two of the four usage modes illustrated in FIG. 18, that is: a notebook mode wherein an included angle between the first surface and the third surface (for example, included angle α in FIG. 17) is within a range of 0°-180°, an panel mode wherein the included angle is 360°, a tent mode wherein the included angle is within a range of 180°-360° and a common side between the first surface and the third surface goes up, and a standing mode wherein the included angle is within the range of 180°-360° and the third surface faces downwards. Please note that the usage modes described herein are only exemplary and would not be considered as limitation to the present disclosure, and other usage modes may be defined according to functions of the electrical device and the usage scene.

Further, the first body 1620 in the display unit may comprise a touch screen so as to operate the electrical device in the different usage modes.

For the disposition of the image collection unit on the display unit, when the image collection unit is a plurality of image collection units, the first image collection unit and the second image collection unit among the plurality of image collection units may be disposed on two edges opposite each other of the display unit; and when the image collection unit is a single image collection unit, the single image collection unit may be disposed on one of two sides of the display unit. As illustrated in FIG. 19a, the first image collection unit and the second image collection unit may locate on middle portion of top edge and bottom edge of the display unit in the notebook computer, respectively. Further, the first image collection unit and the second image collection unit may also locate on left edge and right edge of the display unit in the notebook computer, respectively, and are not required to be the middle portion. Any image collection unit may shift left-and-right or up-and-down with respect to its position on the edge. Please note, the image collection unit 1610 may comprise more than two image collection units, in order to realize a perfect image collection effect in different usage modes of the electrical device, and at least one of the image collection units may be rotated. During colleting images, the image collection units may be disposed around the display unit distributely and controlled to be rotated according to features of the respective usage modes. As illustrated in FIG. 19b, when the image collection unit is a single image collection unit, it may locate a middle portion of the left edge or right edge of the display unit in the notebook computer, and its position may be shift up-and-down in the edge for taking the effect of image collection in different usage modes for account.

In a case that the first image collection unit is disposed on a top side, which is far away from the common side, of the display unit, and the second image collection unit is disposed on a bottom side, which is near to the common side, of the display unit, the step S2020 may comprise: when the judgment result indicates that the notebook computer is in the notebook mode or the standing mode, driving the first image collection unit to be in an operation state while the second image collection unit to be in a close state; when the judgment result indicates that the electrical device is in the tent mode, driving the first image collection unit to be in the close state while the second image collection unit to be in the operation state; and when the judgment result indicates that the electrical device is in the panel mode, driving at least one of the first image collection unit and the second image collection unit to be in the operation state.

When at least two image collection units in the plurality of image collection units are used at the same time to collect the images, for example, when both of the first image collection unit and the second image collection unit are used at the same time to collect the images, the images collected by the first image collection unit and the second image collection unit may be synthesized to generate three-dimension images, thus a spatial effect of the image collected is realized. Those skilled in the art may realize the synthesis in various manners according to actual requirements, and their details are omitted herein.

When the image collection unit is a single image collection unit, the single image collection unit may be rotatable. The process of driving the one or more image collection units in a driving manner matching to the specified usage mode (step S2020) may comprise: rotating the single image collection unit in a manner that the orientation of the single image collection unit matches to the usage mode in which the electrical device is. Therefore, the orientation for collecting the images of the single image collection unit is selected according to features of image collection in different usage modes, thus a perfect effect of image collection is achieved. Further, the single image collection unit may be composed of at least two pickup elements having different image collection scope, in order to enhance the image collection effect of the single image collection unit.

In the method for driving the image collection units according to the present invention, the image collection units are driven differently for the different usage modes in the electrical device, so that the function for collecting images is realized optimally, and the effects of the function for collecting images in different usage modes are considered, which promotes user's experiences.

Those skilled in the art can appreciate that the units and the steps of the algorithm in individual examples described in combination with the embodiments disclosed herein can be implemented in electronic hardware, or the combination of computer software and electronic hardware. Whether the functions are carried out in the form of hardware or in the form of software, it depends on the specific applications of the technical solution and constrains on the design thereof. Those skilled in the art can use different methods to implement the functions as described for each specific application, and such an implementation should not be considered as going beyond the scope of the present invention.

In the embodiments provided in the application, it should be understand that the apparatus and the method as disclosed can be implemented in other manners. For example, the embodiments of the apparatus are only for illustration, e.g., the division of the unit only shows a function division in logic, but in an actual realization, there are other forms of divisions; for example, a plurality of units or components can be combined or can be integrated into another system, or some features can be ignored or are not be carried out.

If the functions are implemented in the function units in software which is on sale or used as separate products, they can be stored in a computer readable storage medium. Based on the understanding, the solution of the present invention in essence or the part of the present invention contributing to the prior art or a part of the technical solution can be embodied in software products, and the computer software products are stored in a storage medium and comprises several instructions to cause a computing device (can be a personal computer, a server, or a network device or the like) to carry out the entire or partial steps of the methods of the individual embodiments of the present invention.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

What is claimed:

1. An information processing method applied to an electrical device having at least a processing unit, a plurality of usage modes, and a plurality of sensing units, the method comprising:

acquiring, by the processing unit, data collected by the plurality of the sensing units;

judging whether the electrical device is in a first usage mode according to the acquired data collected by the plurality of the sensing units;

wherein the first usage mode is one of the plurality of the usage modes, wherein the electrical device includes a first body and a second body, the sensing units include a first image collection unit and a second image collection unit, and the first image collection unit is disposed on the edge of a display in the first body and the second image collection unit is disposed on the edge of a display in the second body;

the first body and the second body can rotate from 0° to 360° with respect to each other; and the usage modes of the electrical device based on the rotating is determined through the information collected by the first image collection unit and the second image collection unit.

2. The information processing method of claim 1, wherein the electrical device has a spin axis connecting the first body with the second body; the second body can rotate a 360° with respect to the first body by means of the spin axis; the plurality of the usage modes at least comprises: a notebook usage mode, a panel usage mode, a tent usage mode and a standing usage mode.

3. The information processing method of claim 2, wherein controlling, by the processing unit, application programs executed in the electrical device so that attributes of the application programs match to the first usage mode, when the processing unit determines the electrical device is in the first usage mode.

4. The information processing method of claim 3, wherein the attributes of the application program comprise a size of window, a text size of the application program, display parameters, or a display direction.

5. The information processing method of claim 3, wherein when the first usage mode is the tent usage mode, controlling, by the processing unit, application programs executed in the electrical device is embodied as:
rotating the display direction of the application program, by the processing unit, so as to be coincident with viewing habits of users.

6. The information processing method of claim 2, wherein the electrical device further comprises peripheral units, and the processing unit controls operation states of the peripheral units so that the operation states of the peripheral units match to the first usage mode, when the processing unit determines that the electrical device is in the first usage mode.

7. The information processing method of claim 6, wherein the operation states comprises an enable state, a disable state, a power-saving state.

8. The information processing method of claim 1, wherein the plurality of the sensing units at least comprise a first gravity sensor and the second gravity sensor, the first gravity sensor is disposed at the first body and the second gravity sensor is disposed on the second body.

9. The information processing method of claim 1, wherein when the first usage mode is the panel computer usage mode,
the processing unit switches an operating system run in the electrical device currently to an ANDROID operating system.

10. The information processing method of claim 1, wherein when the first usage mode is the notebook usage mode,
the processing unit switches an operating system run in the electrical device currently to a WINDOWS operating system.

11. An information processing method applied to an electrical device having at least a processing unit, a first body, a second body and a connection part connecting the first body with the second body, a plurality of sensing units, and a plurality of usage modes, method comprising:
acquiring, by the processing unit, data collected by the plurality of the sensing units;
judging an included angle between the first body with a horizontal plane and/or an included angle between the second body with the horizontal plane according to the acquired data collected by the plurality of the sensing units,
judging whether the electrical device is in a first usage mode according to the acquired data collected by the plurality of the sensing units;
wherein the first usage mode is one of the plurality of the usage modes;
wherein, the sensing units include a first image collection unit and a second image collection unit, and the first image collection unit is disposed on the edge of a display in the first body and the second image collection unit is disposed on the edge of a display in the second body;
the first body and the second body can rotate from 0° to 360° with respect to each other; and the usage modes of the electrical device based on the rotating is determined through the information collected by the first image collection unit and the second image collection unit.

12. An electrical device, wherein the electrical device has a first body, a second body and a spin axis connecting the first body with the second body;
the electrical device has a plurality of usage modes and at least comprises a processor, at least one first gravity sensor disposed at the first body and at least one distance sensor disposed at the second body;
the first gravity sensor is configured to collect a first included angle between a sensitive axis in the first gravity sensor with a gravity direction, when the second body rotates with respect to the first body;
the distance sensor is configured to collect a close distance to an object, when the second body rotates with respect to the first body;
the processor is configured to judge whether the electrical device is in a first usage mode according to the acquired first included angle and close distance to an object, wherein the first usage mode is one of the plurality of usage modes,
wherein, the sensing units include a first image collection unit and a second image collection unit, and the first image collection unit is disposed on the edge of a display in the first body and the second image collection unit is disposed on the edge of a display in the second body;
the first body and the second body can rotate from 0° to 360° with respect to each other by means of the spin axis; and the usage modes of the electrical device based on the rotating is determined through the information collected by the first image collection unit and the second image collection unit.

13. The electrical device of claim 12, wherein the first body has a first surface on which the display unit is located and a second surface being opposite to the first surface, and the second body has a third surface comprising an input apparatus and a fourth surface being opposite to the third surface, the first body rotates 360 degrees with respect to the second body so as to change the usage mode of the electrical device, and the usage modes comprises a notebook mode wherein an included angle between the first surface and the third surface is within a range of 0°-180°, an panel mode wherein the included angle is 360°, a tent mode wherein the included angle is within a range of 180°-360° and a common side between the first surface and the third surface goes up, and a standing mode wherein the included angle is within the range of 180°-360° and the third surface faces downwards.

* * * * *